United States Patent
Yae (10) Patent No.: US 9,532,200 B2
(45) Date of Patent: Dec. 27, 2016

(54) VEHICLE FOR RECOGNIZING DRIVER USING MOBILE DEVICE AND CONTROL METHOD THEREOF

(71) Applicant: HYUNDAI MOTOR COMPANY, Seoul (KR)

(72) Inventor: Seong Soo Yae, Osan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/735,011

(22) Filed: Jun. 9, 2015

(65) Prior Publication Data

US 2016/0174051 A1    Jun. 16, 2016

(30) Foreign Application Priority Data

Dec. 11, 2014 (KR) .................. 10-2014-0178151

(51) Int. Cl.
*H04W 4/16* (2009.01)
*H04W 76/02* (2009.01)
*H04W 4/00* (2009.01)
*B60W 50/00* (2006.01)

(52) U.S. Cl.
CPC ............ *H04W 4/16* (2013.01); *B60W 50/00* (2013.01); *H04W 4/008* (2013.01); *H04W 76/023* (2013.01)

(58) Field of Classification Search
CPC .... G06F 3/04842; G06F 3/0488; G06F 1/163; G06F 3/0416; G06F 2203/04808; G06F 17/3053; G06F 1/3218; G06F 1/3231; G06F 21/36; G06F 2221/2141; H04W 4/008; H04W 4/046; H04W 88/06; H04W 4/16; H04W 76/023; H04L 67/125; B60N 2/24; B60R 2300/301; B60W 50/00; B62D 43/02; G08B 13/2462; G08B 21/02; H04R 2420/05; H04R 2420/07; H04R 29/004

See application file for complete search history.

(56) References Cited

U.S. PATENT DOCUMENTS

| | | | |
|---|---|---|---|
| 8,145,199 B2 | 3/2012 | Tadayon et al. | |
| 8,989,961 B2 * | 3/2015 | Chien | G06F 17/00 455/418 |
| 2011/0257958 A1 * | 10/2011 | Kildevaeld | G06F 3/0488 703/23 |
| 2012/0115413 A1 | 5/2012 | Czaja et al. | |

(Continued)

FOREIGN PATENT DOCUMENTS

| JP | 2006-319727 A | 11/2006 |
|---|---|---|
| JP | 2007-216813 A | 8/2007 |

(Continued)

OTHER PUBLICATIONS

Notice of Allowance issued in corresponding Korean Patent Application No. 10-2014-0178151, mailed on Jun. 2, 2016.

*Primary Examiner* — Nizar Sivji
(74) *Attorney, Agent, or Firm* — McDermott Will & Emery LLP (57) ABSTRACT

A vehicle capable of recognizing a driver having a mobile device includes a smart connector configured to acquire wireless connection information of the driver's mobile device from a wearable device connected to the mobile device. A head unit is configured to perform connection with the mobile device using the wireless connection information of the mobile device acquired from the smart connector.

12 Claims, 5 Drawing Sheets

(56) References Cited

U.S. PATENT DOCUMENTS

| | | | |
|---|---|---|---|
| 2014/0375477 A1* | 12/2014 | Jain | H04W 4/008 340/933 |
| 2015/0192426 A1* | 7/2015 | Foster | G01C 21/3629 715/765 |
| 2015/0246639 A1* | 9/2015 | Nagata | B60Q 9/008 340/435 |
| 2015/0254367 A1* | 9/2015 | Kagan | G06F 3/0482 707/706 |
| 2015/0347080 A1* | 12/2015 | Shin | G09G 3/001 345/173 |
| 2016/0057553 A1* | 2/2016 | Ryu | H04R 27/00 340/4.41 |
| 2016/0088422 A1* | 3/2016 | Foster | G01S 5/0263 455/41.2 |

FOREIGN PATENT DOCUMENTS

| KR | 10-2006-0108803 A | 10/2006 |
|---|---|---|
| KR | 10-2013-0005108 A | 1/2013 |
| KR | 10-1241293 B1 | 3/2013 |
| KR | 10-1347804 B1 | 1/2014 |
| KR | 10-2014-0037591 A | 3/2014 |
| KR | 10-2014-0052424 A | 5/2014 |
| KR | 10-2014-024686 A | 10/2014 |

\* cited by examiner

VEHICLE FOR RECOGNIZING DRIVER USING MOBILE DEVICE AND CONTROL METHOD THEREOF

CROSS REFERENCE TO RELATED APPLICATION

This application claims the benefit of priority to Korean Patent Application No. 10-2014-0178151, filed on Dec. 11, 2014, which is hereby incorporated by reference as if fully set forth herein.

TECHNICAL FIELD

The present disclosure relates to a method for recognizing a driver using a mobile device in a vehicle, and more particularly, to a method for recognizing a driver using interworking between a driver's wearable device and a smartphone and a vehicle for performing the same.

BACKGROUND

A vehicle and a mobile device such as a smartphone can be connected through near field communication such as Bluetooth providing not only hands-free function but also a function of reproducing content of the smartphone in the vehicle through streaming.

However, several mobile devices may be wirelessly connected to a vehicle even in a situation in which only a driver's mobile device needs to be connected to the vehicle for safety reasons. Therefore, a method for identifying the driver's mobile device in the vehicle and connecting only the driver's mobile device to the vehicle is necessary.

SUMMARY

The present disclosure is directed to a vehicle for recognizing a driver's mobile device and a control method thereof that substantially obviate one or more problems due to limitations and disadvantages of the related art.

An aspect of the present inventive concept provides a method for identifying a driver's mobile device and a vehicle for performing the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

According to an exemplary embodiment of the present inventive concept, a vehicle capable of recognizing a driver having a mobile device includes a smart connector configured to acquire wireless connection information of a driver's mobile device from a wearable device connected to the mobile device. A head unit is configured to connect to the mobile device using the wireless connection information of the mobile device acquired from the smart connector.

According to another exemplary embodiment aspect of the present inventive concept, a method for connecting a vehicle to a driver's mobile device includes acquiring wireless connection information of the driver's mobile device from a wearable device connected to the mobile device through a smart connector. The acquired wireless connection information of the mobile device from the smart connector is transmitted to a head unit. The head unit is connected to the mobile device using the wireless connection information of the mobile device transmitted from the smart connector.

According to yet another exemplary embodiment of the present inventive concept, a method for connecting a mobile device to a vehicle includes connecting wirelessly a wearable device and the mobile device. Wireless connection information of a head unit of the vehicle is acquired from a smart tag of the vehicle through the wearable device. The wireless connection information from the wearable device is transmitted to the mobile device. Wireless connection of the mobile device to the head unit is attempted using the wireless connection information.

It is to be understood that both the foregoing general description and the following detailed description of the present inventive concept are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the inventive concept and together with the description serve to explain the principle of the disclosure.

DETAILED DESCRIPTION

Reference will now be made in detail to exemplary embodiments of the present inventive concept, examples of which are illustrated in the accompanying drawings. In the drawings, the same or similar elements are denoted by the same reference numerals even though they are depicted in different drawings, and a detailed description thereof will be omitted. The suffixes "module" and "unit" in elements used in the description below are given or used together only in consideration of ease in preparation of the specification and do not have distinctive meanings or functions. In the following description of embodiments of the present inventive concept, a detailed description of known functions and configurations incorporated herein will be omitted when it may make the subject matter of the present disclosure rather unclear. Further, the accompanying drawings have been made only for a better understanding of the embodiments of the present inventive concept. It will be appreciated that the technical spirit disclosed in the specification is not restricted by the accompanying drawings and includes various modifications, equivalents, and substitutions, without departing from the scope and spirit of the disclosure as disclosed in the accompanying claims.

Recently, cases in which a user having a mobile device such as a smartphone possesses a bracelet or watch type wearable device have been gradually increasing. Such a wearable device pairs with the smartphone so as to exchange data with the smartphone. Thus, an exemplary embodiment of the present inventive concept provides wireless communication connection information of a vehicle at a position readable by a wearable device worn by a user through near field communication to provide the wireless communication connection information of the vehicle to the wearable device. A data path is established between a driver's mobile device, which receives the wireless communication connection information of the vehicle from the wearable device, and the vehicle using the corresponding information.

Hereinafter, unless separately mentioned, it will be assumed that a driver's mobile device is a smartphone and a wearable device worn by a driver is a watch type wearable device (i.e., a smart watch). Further, it will be assumed that establishing of a data path for bidirectional data exchange between a driver's smartphone and a wearable device (for example, in the case of Bluetooth connection, pairing therebetween) is completed. However, it will be apparent to those skilled in the art that such a configuration may be applied to other type wearable devices or mobile devices.

Figure 1:
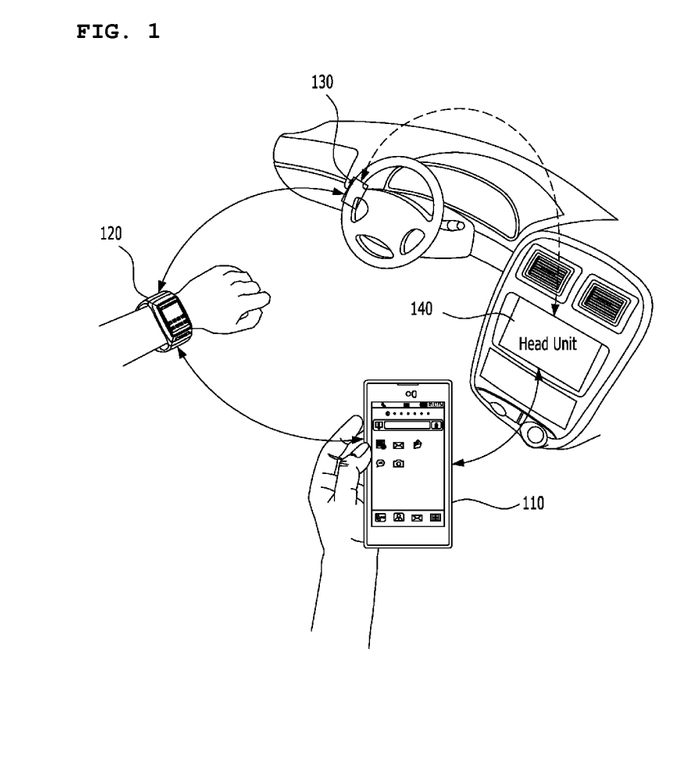
FIG. 1 is a schematic view illustrating connection between a vehicle and a mobile device in accordance with an embodiment of the present inventive concept.

FIG. 1 is a schematic view illustrating connection between a vehicle and a mobile device in accordance with an embodiment of the present inventive concept.

With reference to FIG. 1, a driver's smartphone 110 is connected to a watch type wearable device 120, a smart tag 130 is installed on a steering wheel, and a vehicle head unit 140 connectable to the smartphone 110 is installed in a vehicle.

The smartphone 110 may provide a service suitable for the vehicle when it is connected to the vehicle head unit 140. Execution of some functions of the smartphone 110 (for example, text messages, DMB, games, and the like) may be restricted for safety when driving after the smartphone 110 is connected to the vehicle head unit 140.

The smart tag 130 may store wireless connection information of the vehicle. The stored wireless connection information may be read out by the watch type wearable device 120 through a near field communication method such as radio-frequency identification (RFID) or near field communication (NFC). The information recorded in the smart tag 130 may include information required for connection to a connectivity providing network used in the vehicle, such as a class (for example "Car"), a vehicle name (for example "Sonata"), a vehicle Bluetooth device (BD) address, a Wi-Fi Mac address, and a connection password.

Table 1 below shows information stored in the smart tag 130 as an example.

TABLE 1

| Class | BT Address | Wi-Fi Address | Password | GPS value | Move | Others |
|---|---|---|---|---|---|---|
| Car | 12:XX:XX:XX | 12:XX:XX:XX~ | 12345678 | Latitude:X, Longitude:X | On, Off | According to services |

When the driver grabs the steering wheel, the smart tag 130 is adjacent a driver's wrist on which the watch type wearable device 120 is placed, and therefore, the smart tag 130 is provided on the steering wheel to be operated only by the driver. However, such a position of the smart tag 30 is exemplary and may be changed according to the position of the wearable device (for example, the smart tag 30 may be provided on a pedal for an anklet or shoe type wearable device). Further, the smart tag 130 may be attached to or replaced with a device providing bidirectional near field communication, such as a smart connector. This will be described later in more detail.

The watch type wearable device 120 may have an RFID reader or an NFC module to read the information of the smart tag 130. If the watch type wearable device 120 has a global positioning system (GPS) module, the watch type wearable device 120 may sense a position change of the vehicle through the GPS module in order to inform the smartphone 110 of whether or not the vehicle moves. The watch type wearable device 120 may convert a changed GPS value into a flag type, such as "Move=On", and then transmit the converted type to the smartphone 110 so as to be used by the smartphone 110, or transmit raw data of the changed GPS value to the smartphone 110.

Further, the watch type wearable device 120 may play a key role in connection between the vehicle (i.e., the head unit 140) and the smartphone 110 by transmitting the information read from the smart tag 130 to the smartphone 110.

The head unit 140, which is a multimedia device installed in the vehicle, may be connected to the smartphone 110 in order to provide various multimedia services.

The various multimedia services include hands-free service, a smartphone manipulation environment provision service (iOS in a vehicle or a Google projected mode), a music streaming function, a data server function, a voice recognition function, and the like.

In the present disclosure, there are three situations in which the wearable device 120 acquires wireless connection information of the vehicle or one of the smartphone 110 and the head unit 140 attempts connection first. Table 2 below states these exemplary situations.

TABLE 2

| Vehicle information provider | Connection attempter | Type | Driver recognition |
|---|---|---|---|
| Smart tag | Smartphone | No communication between head unit and tag | Since wearable device knows driver's smartphone information, separate driver recognition is not necessary. |
| Smart connector | Head unit | No communication between head unit and tag but communication between smart connector and head unit | Head unit recognizes driver through smartphone address transmitted from wearable device. |
| Smart connector | Smartphone | No communication between head unit and tag but communication between smart connector and head unit | Since wearable device knows driver's smartphone information, separate driver recognition is not necessary. |

With reference to Table 2, the present disclosure may be divided into a case 1) in that, if a smart tag is used, the watch type wearable device reads the smart tag and transmits wireless connection information of the head unit to the smartphone which attempts connection to the head unit, a case 2) in that, if a smart connector is used, the wearable device provides wireless connection information of the smartphone to the smart connector, and the head unit receives the wireless connection information transmitted from the smart connector and attempts connection to the smartphone, and a case 3) in that, if a smart connector is used, the smart connector reads wireless connection information of the head unit and provides the read wireless connection information to the wearable device, the wearable device transmits the wireless connection information to the smartphone and the smartphone attempts connection to the head unit.

First, the case 1) will be described with reference to FIG. 2.

Figure 2:
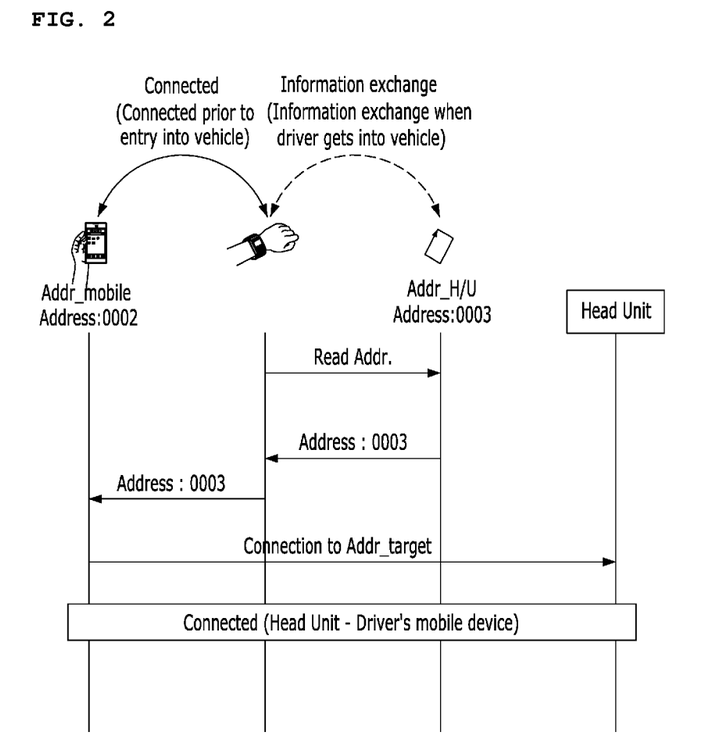
FIG. 2 is a view illustrating one exemplary process of connecting a driver's smartphone and a head unit in a vehicle in accordance with an embodiment of the present inventive concept.

FIG. 2 is a view illustrating an exemplary process of connecting a driver's smartphone and a head unit in a vehicle in accordance with an embodiment of the present inventive concept.

In FIG. 2, it is assumed that pairing between the smartphone and a smart watch has been completed. Further, it is assumed that wireless network address of the smartphone is 0002 and wireless network address of the head unit is 0003.

With reference to FIG. 2, as a driver gets into a vehicle and grabs a steering wheel, the smart watch reads the address 0003 of the head unit from the smart tag installed on the steering wheel. The smart watch transmits the read address 0003 to the smartphone, and the smartphone attempts connection to the head unit using the received address 0003 of the head unit. Therefore, the driver's smartphone and the head unit may be connected.

Thereafter, the case 2) will be described with reference to FIG. 3.

Figure 3:
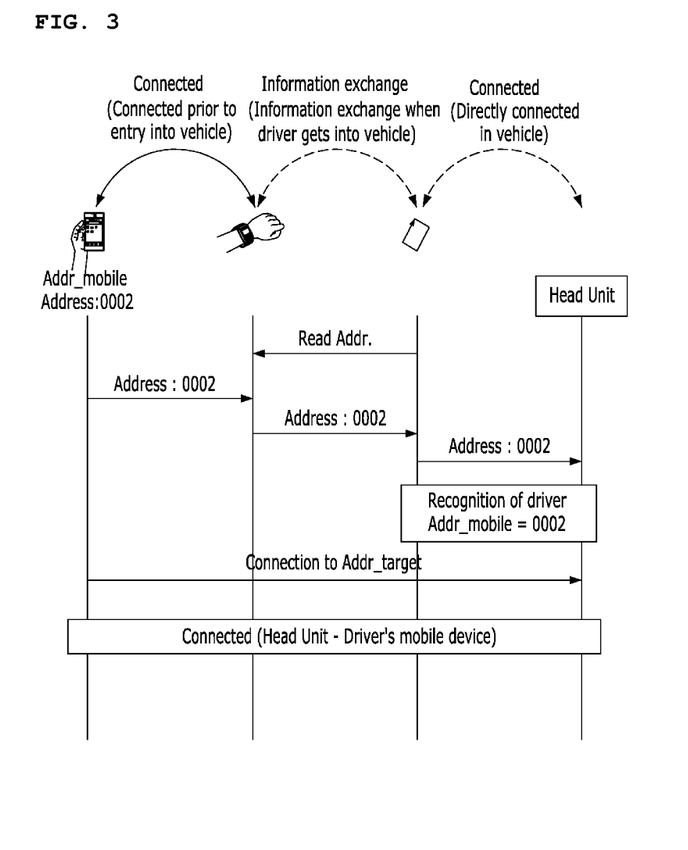
FIG. 3 is a view illustrating another exemplary process of connecting a driver's smartphone and a head unit in a vehicle in accordance with an embodiment of the present inventive concept.

FIG. 3 is a view illustrating another exemplary process of connecting a driver's smartphone and a head unit in a vehicle in accordance with an embodiment of the present inventive concept.

In FIG. 3, the same assumption as in FIG. 2 is used.

With reference to FIG. 3, as a driver gets into a vehicle and puts his/her hand on a steering wheel, the smart watch transmits the address 0002 of the smartphone to a smart connector installed on the steering wheel. The smart connector transmits the read address 0002 to the head unit, and the head unit attempts connection to the smartphone using the received address of the smartphone. Therefore, the driver's smartphone and the head unit may be connected.

Thereafter, the case 3) will be described with reference to FIG. 4.

Figure 4:
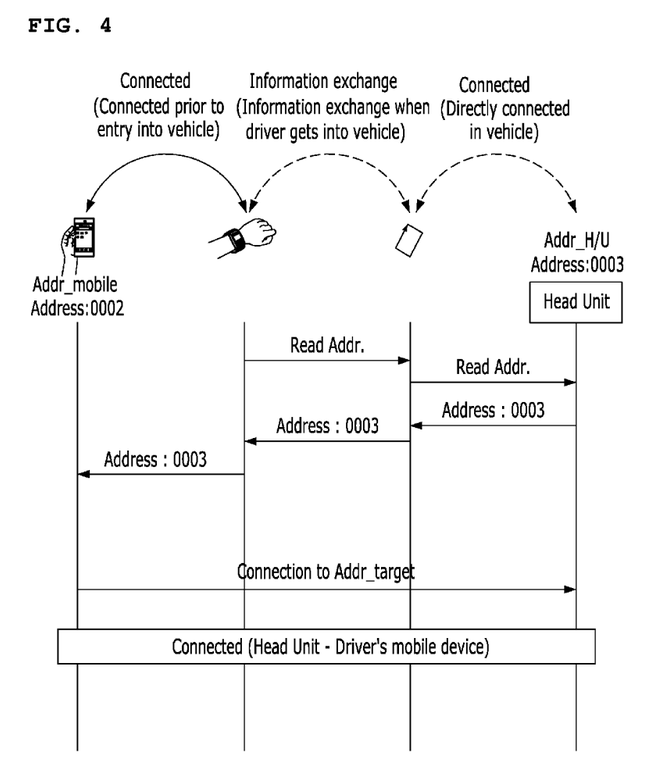
FIG. 4 is a view illustrating yet another exemplary process of connecting a driver's smartphone and a head unit in a vehicle in accordance with an embodiment of the present inventive concept.

FIG. 4 is a view illustrating yet another exemplary process of connecting a driver's smartphone and a head unit in a vehicle in accordance with an embodiment of the present inventive concept.

In FIG. 4, the same assumption as in FIG. 2 is used.

With reference to FIG. 4, the smart connector acquires the address 0003 of the head unit by communicating with the head unit. As a driver gets into a vehicle and grabs a steering wheel, the smart watch reads the address 0003 of the head unit from the smart connector installed on the steering wheel. The smart watch transmits the read address 0003 to the smartphone and the smartphone attempts connection to the head unit using the received address 0003 of the head unit. Therefore, the driver's smartphone and the head unit may be connected.

Hereinafter, with reference to FIGS. 5(a) to 5(e), connection between a driver's smartphone and a head unit through the process shown in FIG. 2 and execution of additional functions therethrough will be exemplarily described in more detail.

Figure 5A:
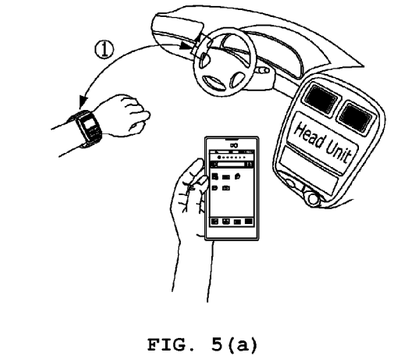
FIGS. 5(a) to 5(e) are views illustrating connection between a driver's smartphone and a head unit in a vehicle and execution of an additional function therethrough in accordance with an embodiment of the present inventive concept.

With reference to FIG. 5(a), as a driver enters a vehicle, a smart watch automatically reads information of a smart tag (or a smart connector) installed on a steering wheel (①).

The smart watch confirms that a user is in the vehicle by determining that the value of "Class" of the read information is "Car". If the smart connector is used, the smart connector may confirm the value of "Class" of the smartphone from the smart watch.

Figure 5B:
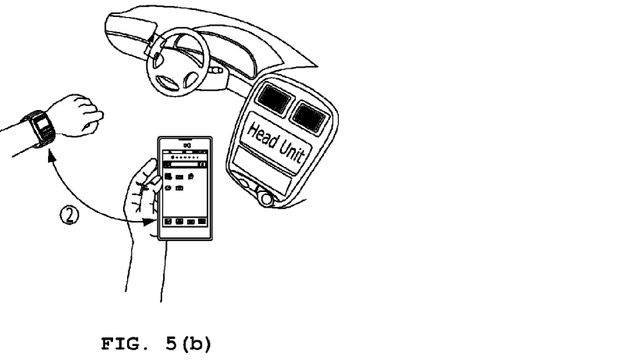

As shown in FIG. 5(b), the smart watch reads the Bluetooth device address and the MAC address of the head unit acquired from the smart tag and transmits the read addresses to the smartphone (②).

Figure 5C:
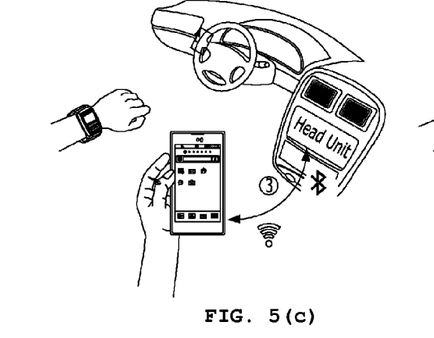

Referring to FIG. 5(c), the smartphone attempts Bluetooth connection and/or Wi-Fi connection to the vehicle using these addresses (③). Thereby, the smartphone and the head unit may be connected wirelessly.

Figure 5D:
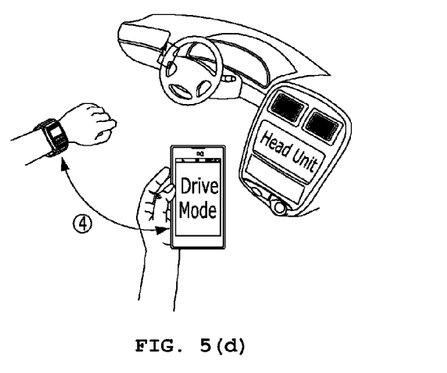

When Bluetooth connection and/or Wi-Fi connection is carried out, as shown in FIG. 5(d), the smartphone transmits information indicating completion of connection to the smart watch (④). The smart watch having received connection information issues a command to switch to a drive mode to the smartphone. The condition of the switching command may indicate that one of Bluetooth connection and Wi-Fi connection is carried out through the connection information (Class=Car, BT=Connected, Wi-Fi=Connected). The smartphone having received the drive mode switching command is switched to the drive mode.

Here, the drive mode may be divided into a standby mode and a driving mode. The standby mode means a mode in which only functions of the vehicle usable during stopping are activated, and the driving mode means a mode in which only functions of the vehicle usable during driving are activated. In general, more functions are restricted in the driving mode than the standby mode.

Figure 5E:
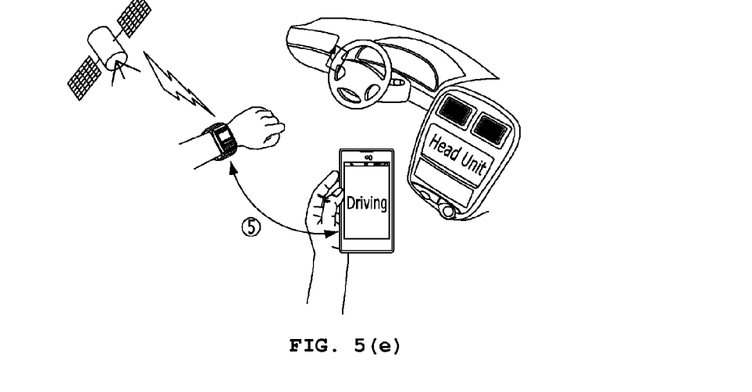

Referring to FIG. 5(e), when GPS information is changed, the smart watch may inform the smartphone that the vehicle is moving (⑤). Such a process may be performed only if the smartphone does not have a GPS function, and be carried out by the head unit sensing whether or not the vehicle drives, instead of the smart watch.

When the smartphone in the standby mode receives a signal indicating that the vehicle is moving, the smartphone is switched to the driving mode and thus does not perform specific functions such as a text function and a moving picture reproduction function for safety.

In the above-described embodiments, the smartphone and the smart watch may include a GPS module to acquire position information, a wireless communication module for wireless communication (Bluetooth, Wi-Fi and the like) between the smartphone and the smart watch or with the head unit, a near field communication (RFID, NFC, and the like) module for communication with the smart tag or the smart connector, and a controller to control the above-described modules and a connection process thereof. Further, the head unit may include a wired communication module for communication with the smart connector and other controllers, a wireless communication module for wireless communication with the smartphone and a controller to control the above-described modules and a connection process thereof. Here, only elements participating in implementation of the present disclosure are disclosed and each device may include a larger number of elements.

The above-described embodiments may be recorded in a non-transitory computer readable storage medium in which programs are recorded, as computer readable code. Computer readable storage media include all kinds of storage devices in which data readable by a computer system is stored. For example, computer readable media include a hard disk drive (HDD), a solid state disk (SSD), a silicon disk drive (SDD), a ROM, a RAM, a CD-ROM, a magnetic tape, a floppy disk, optical data storage media and the like, and may be implemented in the form of a carrier wave (for example, transmission via the Internet).

As apparent from the above description, at least one embodiment of the present disclosure has below effects.

Since wireless connection information of a vehicle is provided to a driver's wearable device and then transmitted to a driver's mobile device, the vehicle and the driver's mobile device may be conveniently connected.

Particularly, when the wireless connection information of the vehicle is provided inside the vehicle close to the driver, even if there is a plurality of passengers, the wireless connection information of the vehicle may be provided only to the driver's mobile device.

It will be apparent to those skilled in the art that various modifications and variations can be made in the present disclosure without departing from the spirit or scope of the invention. Thus, it is intended that the present disclosure covers the modifications and variations of this invention provided they come within the scope of the appended claims and their equivalents.

What is claimed is:

1. A vehicle capable of recognizing a driver having a mobile device, the vehicle comprising:
  a smart connector configured to detect a wearable device of the driver wirelessly connected to the mobile device, acquire wireless connection information of the mobile device from the wearable device, and transmit the acquired wireless connection information of the mobile device to a head unit; and
  the head unit configured to perform wireless connection with the mobile device using the wireless connection information of the mobile device transmitted from the smart connector, to cause a controller of the mobile device to:
    when the wireless connection to the head unit is completed, control a wireless communication module of the mobile device to transmit information indicating completion of the wireless connection to the wearable device, and
    when a command to switch to a drive mode, in which at least one function of the mobile device is deactivated, is received from the wearable device, switch to the drive mode,
  wherein the wireless connection information of the mobile device includes information required for connecting the mobile device to a network provided by the vehicle.

2. The vehicle according to claim 1, wherein:
  the wearable device includes a smart watch; and
  the smart connector is disposed on a steering wheel of the vehicle.

3. The vehicle according to claim 1, wherein the wireless connection information includes at least one of a Bluetooth device address of the mobile device, a Wi-Fi MAC address, a Wi-Fi connection password, and vehicle information.

4. A method for connecting a vehicle to a driver's mobile device comprising steps of:
  detecting, by a smart connector installed in the vehicle, a wearable device of the driver wirelessly connected to the mobile device;
  acquiring, by the smart connector, wireless connection information of the mobile device from the wearable device; and
  transmitting, by the smart connector, the acquired wireless connection information of the mobile device from the smart connector to a head unit of the vehicle to cause the head unit to wirelessly connect to the mobile device using the wireless connection information of the mobile device,
  wherein the wireless connection information of the mobile device includes information required for connecting the mobile device to a network provided by the vehicle, and
  the smart connector causes a controller of the mobile device to:
    when the wireless connection to the head unit is completed, control a wireless communication module of the mobile device to transmit information indicating completion of the wireless connection to the wearable device, and
    when a command to switch to a drive mode, in which at least one function of the mobile device is deactivated, is received from the wearable device, to switch to the drive mode.

5. The method according to claim 4, wherein the wireless connection information includes at least one of a Bluetooth device address of the mobile device, a Wi-Fi MAC address, a Wi-Fi connection password, and vehicle information.

6. A wearable device wirelessly connecting a mobile device to a head unit of a vehicle, the wearable device configured to establish a wireless connection with a smart tag of the vehicle and read wireless connection information of the head unit from the smart tag of the vehicle, and transmit the wireless connection information to the mobile device,
- wherein upon receiving information indicating completion of a wireless connection between the mobile device and the head unit from the mobile device, the wearable device transmits a command to the mobile device to cause the mobile device to switch to a drive mode, in which at least one function of the mobile device is deactivated, and
- wherein the wireless connection information of the head unit includes information required for connecting the mobile device to a network provided by the vehicle.

7. The wearable device according to claim 6, further comprising: a global positioning system (GPS) for position recognition,
- wherein the wearable device is configured to, when change of position information is sensed through the GPS, transmit a signal corresponding to the change of the position information to the mobile device.

8. The wearable device according to claim 6, wherein the wireless connection information includes at least one of a Bluetooth device address of the head unit, a Wi-Fi MAC address, a Wi-Fi connection password, and vehicle information.

9. A mobile device performing wireless connection with a head unit of a vehicle, the mobile device comprising:
- a wireless communication module configured to wirelessly exchange data with a wearable device and receive wireless connection information of the head unit from the wearable device; and
- a controller configured to control the wireless communication module to wirelessly connect to the head unit using the wireless connection information,
- wherein the wireless connection information of the head unit includes information required for connecting the mobile device to a network provided by the vehicle, and
- wherein the controller is configured to, when the wireless connection to the head unit is completed, control the wireless communication module to transmit information indicating completion of the wireless connection to the wearable device, and when a command to switch to a drive mode, in which at least one function of the mobile device is deactivated, is received from the wearable device, switch to the drive mode.

10. The mobile device according to claim 9, wherein the wireless connection information includes at least one of a Bluetooth device address of the head unit, a Wi-Fi MAC address, a Wi-Fi connection password, and vehicle information.

11. A method for connecting a mobile device to a vehicle comprising:
- connecting wirelessly a wearable device with the mobile device;
- connecting wirelessly the wearable device with a smart tag of the vehicle, and acquiring, by the wearable device, wireless connection information of a head unit of the vehicle from the smart tag;
- transmitting, by the wearable device, the wireless connection information to the mobile device to cause the mobile device to attempt a wireless connection with the head unit using the wireless connection information;
- completing wireless connection between the mobile device and the head unit;
- transmitting information indicating completion of the wireless connection from the mobile device to the wearable device;
- transmitting a command to switch to a drive mode, in which at least one function of the mobile device is deactivated, from the wearable device to the mobile device; and
- switching the mobile device to the drive mode,
- wherein the wireless connection information of the head unit includes information required for connecting the mobile device to a network provided by the vehicle.

12. The method according to claim 11, wherein the wireless connection information includes at least one of a Bluetooth device address of the head unit, a Wi-Fi MAC address, a Wi-Fi connection password, and vehicle information.

* * * * *